(12) United States Patent
Johnson et al.

(10) Patent No.: US 7,379,228 B2
(45) Date of Patent: May 27, 2008

(54) ELECTROPHORETIC DISPLAY

(75) Inventors: Mark Thomas Johnson, Eindhoven (NL); Lucas Josef Maria Schlangen, Eindhoven (NL)

(73) Assignee: Koninklijke Philips Electroncis N.V., Eindhoven (NL)

( * ) Notice: Subject to any disclaimer, the term of this patent is extended or adjusted under 35 U.S.C. 154(b) by 268 days.

(21) Appl. No.: 10/542,133

(22) PCT Filed: Dec. 19, 2003

(86) PCT No.: PCT/IB03/06316

§ 371 (c)(1), (2), (4) Date: Jul. 12, 2005

(87) PCT Pub. No.: WO2004/066023

PCT Pub. Date: Aug. 5, 2004

(65) Prior Publication Data

US 2006/0050362 A1 Mar. 9, 2006

(30) Foreign Application Priority Data

Jan. 17, 2003 (EP) .................................. 03100080

(51) Int. Cl.
G02B 26/00 (2006.01)
G09G 3/34 (2006.01)
G03G 13/00 (2006.01)

(52) U.S. Cl. ................... 359/296; 345/107; 430/31

(58) Field of Classification Search ................ 359/296; 345/107; 430/31, 32
See application file for complete search history.

(56) References Cited

U.S. PATENT DOCUMENTS 3,976,485 A * 8/1976 Groner .................. 430/38
4,947,157 A 8/1990 Di Santo et al.
6,017,584 A 1/2000 Albert et al.
6,271,823 B1 8/2001 Gordon, II et al.
7,034,987 B2 * 4/2006 Schlangen ................... 359/296
2002/0067333 A1 6/2002 Uno et al.
2002/0171619 A1 * 11/2002 Gordon et al. ............... 345/107
2003/0038772 A1 * 2/2003 De Boer et al. ............. 345/107
2005/0213014 A1 * 9/2005 Feenstra et al. ............. 349/144

FOREIGN PATENT DOCUMENTS

| WO | 9428202 A1 | 12/1994 |
| WO | WO01/82301 A2 | 11/2001 |
| WO | 0221201 A2 | 3/2002 |
| WO | 9910768 A1 | 3/2007 |

OTHER PUBLICATIONS

Standard ECMA-267, 3rd Edition—Apr. 2001, ECMA-Standardizing Information and Communications Systems, 120 mm DVD—Read-Only Disk.

* cited by examiner

*Primary Examiner*—Scott J. Sugarman
*Assistant Examiner*—DaWayne A Pinkney
(74) *Attorney, Agent, or Firm*—Paul Im

(57) ABSTRACT

An electrophoretic display comprises a pixel which has a pixel volume comprising a reservoir volume and an image volume. Particles which have different colors and different electrophoretic mobilities are present in the pixel volume. An amount of the particles present in the image volume determines a visible color of the pixel. Select electrodes generate in the reservoir volume a select electric field which separates the particles in different sub-volumes in the reservoir volume. Fill electrodes generate a fill electric field to move the particles from the different sub-volumes into the image volume.

21 Claims, 7 Drawing Sheets

ELECTROPHORETIC DISPLAY

The invention relates to an electrophoretic display, to a method of driving such an electrophoretic display, and to a display apparatus comprising such an electrophoretic display.

U.S. Pat. No. 6,271,823 discloses a reflective electrophoretic color display. The display comprises pixel elements (also referred to as pixels) adjacently located in a plane. The pixels comprise at least two sub-pixels or cells which are also adjacently located in the same plane. The different cells of a pixel reflect a different color. The color of a pixel is determined by the additive mixture of the colors reflected by each of its respective cells.

Each cell comprises a light-transmissive front window, a non-obstructing counter electrode, a light-reflective panel, a color filter medium, and a suspension of charged, light-absorbing pigment particles in a light-transmissive fluid.

The amount of colored light reflected by each cell is controlled by the position of the pigment particles within the cell by applying appropriate voltages to the collecting and counter electrodes. When the pigment particles are positioned in the path of the light, the light is significantly attenuated before emerging from the front window, and the viewer sees a dim color or black. When the pigment particles are substantially removed form the path of the light, light can be reflected back through the front window to the viewer without significant attenuation, and the viewer sees the color transmitted by the color filter medium. The color filter medium can, for example, be a light-transmissive colored filter element, a colored light-reflecting panel, or the pigment suspension fluid itself.

This prior art has the drawback that as each cell can only modulate a single color, several cells are required per pixel to obtain a multicolor display. For this reason, the display will not be able to produce bright colors, and especially not bright primary colors (red, green, blue), as these will only be produced by one of several cells in a pixel.

It is an object of the present system to provide an electrophoretic display which is brighter and/or enables a higher resolution.

A first aspect of the present system provides an electrophoretic display. A second aspect of the present system provides a method of driving an electrophoretic display. A third aspect of the present system provides a display apparatus comprising such an electrophoretic display. Advantageous embodiments of the present system are defined in the dependent claims.

The electrophoretic display in accordance with the present system comprises a pixel. The pixel has a pixel volume which comprises a reservoir volume and an image volume.

Different types of particles which have different colors and different electrophoretic mobility's are present in the pixel volume. The particles determine a visible color of the pixel when present in the image volume, and the particles do not contribute to the visible color of the pixel when present in the reservoir volume.

Select electrodes are present which generate in the reservoir volume a select electric field which separates the different types of particles in different sub-volumes in the reservoir volume. A voltage supplied between the select electrodes generates a select electric field which exerts a force on the particles. The particles will start moving due to this force with a speed which depends on the mobility of the particles. Within a particular time period that the select electric field is present, particles with a high mobility will move further than particles with a low mobility. In this manner, it is possible to separate the different particles in different sub-volumes of the reservoir volume.

Fill electrodes generate a fill electric field to move the different types of particles from the different sub-volumes into the image volume. The fill electric field moves the particles which are separated in the different sub-volumes into the image volume to determine the color of the pixel. The color of the pixel will depend on the time period the fill electric field is present. If the fill electric field is present for a short duration, much more particles with the highest mobility will be moved into the image volume than the particles with the lowest mobility. If the fill electric field is present for a long duration, all the particles will be moved into the image volume and thus different colors of the pixel are possible with a single image volume. It is not required to have several separate cells to obtain different colors. Consequently, if the image volume is equal to the volume of a prior art cell, the pixel in accordance with the invention will cover a smaller area and thus the resolution of the display can be higher. If the pixel volume of the pixel in accordance with the invention is equal to the volume of the several cells of a prior art pixel, the brightness may become higher, as the pixel boundaries occupy less pixel volume or area. Since the portion of each prior art pixel producing the desired color is smaller than in the present invention, the color will appear much less bright than if the entire pixel were able to produce the required color as is the case in the present invention.

In an embodiment of the present system, the at least one fill electrode is positioned to obtain a fill electric field directed to simultaneously move the different types of particles from the sub-volumes into the image volume. This has the advantage that the time required to fill the image volume with the particles is decreased considerably.

In an embodiment of the present system, the fill electric field can be controlled for each type of particle separately, and thus, the number of particles of each type which are transported from the sub-volumes to the image volume can be freely controlled. Consequently, it is possible to make all color shades based on the different colors of the different particles. In the prior art, at least three different cells with different colored particles would be required to be able to make the same color shades as the pixel with a single image volume in accordance with the invention. Thus, although the reservoir volume will occupy some of the space of the three prior art cells, the pixel in accordance with an embodiment of the present system will be substantially smaller than the prior art pixel. In addition, the pixel will be brighter.

The number of particles which will move from a particular one of the sub-volumes into the image volume will depend on the strength of the particular fill electric field within the particular sub-volume and on the duration during which this field is present.

In an embodiment of the present system, additional shielding electrodes, which may comprise shielding portions of the fill electrode are arranged in-between the sub-volumes to shield the fill electric field in a particular sub-volume from the fill electric field in an adjacent sub-volume. This has the advantage that the sub fill electric fields which occur in the sub-volumes substantially act on the particles in the corresponding sub-volume only.

In an embodiment of the present system, the pixel comprises a further fill electrode which is positioned to enlarge the fill electric field in the image volume to speed up the filling of the visible part of the pixel by particles entering the image volume from the sub-volumes.

In an embodiment of the present system, the further fill electrode is positioned maximally far from the area where the particles enter the image volume at the border of the image volume. The further fill electrode may be positioned inside or just outside the image volume. It is also possible to provide the further fill electrode in the image volume at a shorter distance to the sub-volumes such that the further fill electric field caused by the further fill electrode increases and the particles will fill the image volume faster.

In an embodiment of the present system, the distance of the further fill electrode to the sub-volumes varies such that the further fill electrode is nearest to the sub-volume containing the particles with the lowest mobility. This has the advantage that a higher field is obtained for the slowest particles such that the speed of movement of these particles increases and the filling time of the image volume decreases.

In an embodiment of the present system, the pixel comprises a further reservoir volume. The pixel comprises further select electrodes and fill electrodes which are associated with the further reservoir in the same manner as the first mentioned select electrodes and the first mentioned fill electrodes are associated with the first mentioned reservoir volume. The function of the further reservoir volume is the same as the first mentioned reservoir volume. This embodiment has the advantage that the refresh rate of the display can be increased because the selection process in one of the reservoirs can be performed in parallel with the filling or reset process from another reservoir. It is possible to associate more than two reservoirs with a same image volume.

In an embodiment of the present system, the reset means remove the particles from the image volume. This enables to periodically change the color of a pixel, which enables to display time varying display information. The particles removed from the image volume are stored in a store volume in the reservoir volume. If all the particles are stored in the same store volume, it is easier to separate the different particles during the select phase wherein the select electric field is present, because the particles all have substantially the same starting position.

In an embodiment of the present system, the reset means comprise at least one of the select electrodes for attracting the particles in the image volume towards the store volume which will be positioned adjacent to the one of the select electrodes.

In an embodiment of the present system, the mobility of the different type of particles has a predetermined ratio such that it is possible to separate the different particles in their respective sub-volumes of the reservoir volume starting from the store volume where all the particles are gathered at the start of the separating phase. For example, if the length of the reservoir volume in the direction of the movement of the particles during the separating phase is substantially three times the area required by the different particles in the different sub-volumes, the ratio should by in the order of 1:2:3. In time period sufficient to move the fastest particles to the sub-volume the farthest away from the store volume, the slowest particles will move to the nearest sub-volume.

If the length of the reservoir volume is much longer than three times the area of the sub-volumes, and the store volume is positioned in one of the extreme positions within the reservoir volume, a particular time period is required to move the fastest particles to the other extreme position within the reservoir volume. As it is still possible to obtain the adjacent sub-volumes which now are collectively positioned near the other extreme position, the path over which the different particles have to travel become more equal in length, and thus the mobility of the different particles can be selected near to each other while it still possible to separate the different particles in the different sub-volumes. This has the advantage that the mobility of the slowest particles can be increased. Consequently, the fill and reset phases will take less time.

In an embodiment of the present system, all the particles are charged with a charge of the same polarity, thus all the three different particles are charged positively or negatively. The mobilities of the particles are different. With three suitably different colored particles it is possible to make a full color display.

In an embodiment of the present system, the particles comprise a first and a second type of particles both being charged in the same polarity and having different mobilities and a third type of particles being charged oppositely. This has the advantage that only the two particles which have the same polarity need to be separated. The difference in mobility will be less than if three sets of particles which the same polarity and three different mobilities have to be used.

In an embodiment of the present system, the pixel comprises a reset electrode to attract the particles during a reset phase wherein the particles have to be moved into a store volume in the reservoir volume. The reset electrode increases the electrical field in the direction of the store volume to increase the speed of the particles moving towards the store volume. This is especially true for particles which are the furthest away from the store volume.

In an embodiment of the present system the reset electrode is associated with the center of the image volume. For example the reset electrode is positioned on top of the center image volume or within the image volume. First, a voltage is supplied to the reset electrode to attract the particles towards the center of the image volume, and secondly a voltage is supplied to the select electrodes which are associated with the store volume to attract the particles to move from the center of the image volume into the store volume. This allows a shortened reset period as the slowest pixels which were the farthest away from the store volume need to travel a shorter distance from the center of the pixel to the store volume.

These and other aspects of the display of the present system will be elucidated and described with reference to the embodiments described hereinafter.

In the drawings.

The same references in different Figs. refer to the same signals or to the same elements performing the same function.

Figure 1:
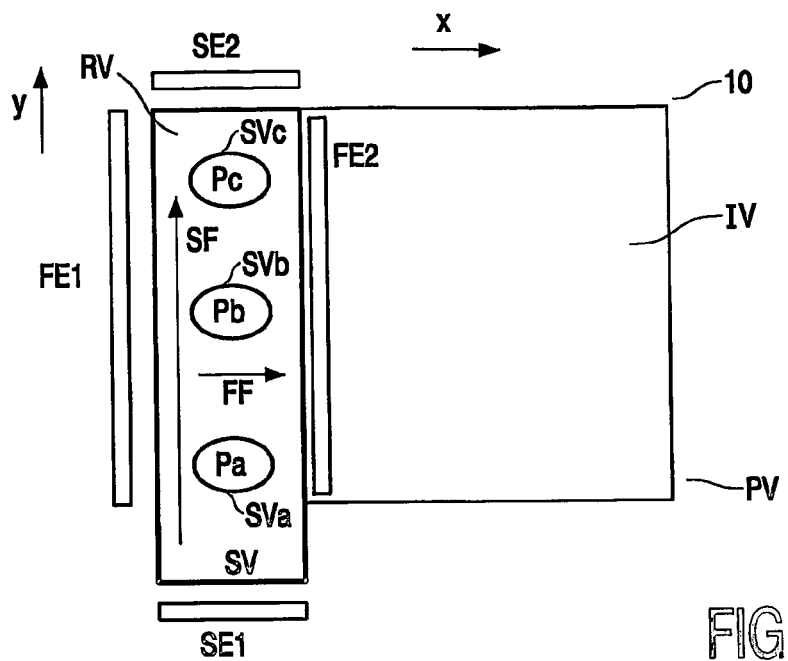
FIG. 1 shows a pixel with a single reservoir volume in accordance with an embodiment of the invention.

FIG. 1 shows a pixel with a single reservoir volume in accordance with an embodiment of the invention. The pixel 10 has a pixel volume PV which comprises a reservoir volume RV and an image volume IV. In the pixel 10, three differently colored particles Pa, Pb, Pc with different electrophoretic mobility are present. The visible color of the pixel is determined by the amount of the particles Pa, Pb, Pc which is present in the image volume IV. Preferably, the colors of the particles are selected to be able to produce a maximum amount of hues. For example, the particles are colored yellow, magenta and cyan. The select electrodes SE1 and SE2 are present at opposite sides of the reservoir volume RV to generate a select electric field SF (further also referred to as select field SF) in the reservoir volume RV in the y-direction. The fill electrodes FE1 and FE2 are present in a plane which is perpendicular to the plane in which the select electrodes SE1 and SE2 are present. The fill electrodes FE1 and FE2 generate a fill electric field FF (further also referred to as fill field FF) in the x-direction perpendicular to the y-direction.

In general, all electrodes can be formed as thin conducting layers situated on one of the substrate layers of which the cell is comprised. The electrodes, and in particular the fill electrode FE2 may also be in the form of barriers, having many small holes or a few large holes to allow the particles Pa, Pb, Pc to pass, or the fill electrode FE2 may comprise at least one strip.

To enable a rendering of different pictures on the display, the pixel 10 is driven as elucidated in the following description.

At the start of a display period (also referred to as refresh period) of the pixel 10 wherein the color of the pixel 10 has to be adapted in conformance with the data to be displayed during this display period, during a reset phase, all colored particles Pa, Pb, Pc which were moved into the image volume IV in accordance with a previous image data are removed from the image volume IV into the store volume SV of the reservoir volume RV using an attractive voltage pulse on the select electrode SE1. Thus, in an initial state, the colored particles Pa, Pb, Pc are stored in the store volume SV such that all the particles Pa, Pb, Pc have a substantially same starting position.

Figure 2:
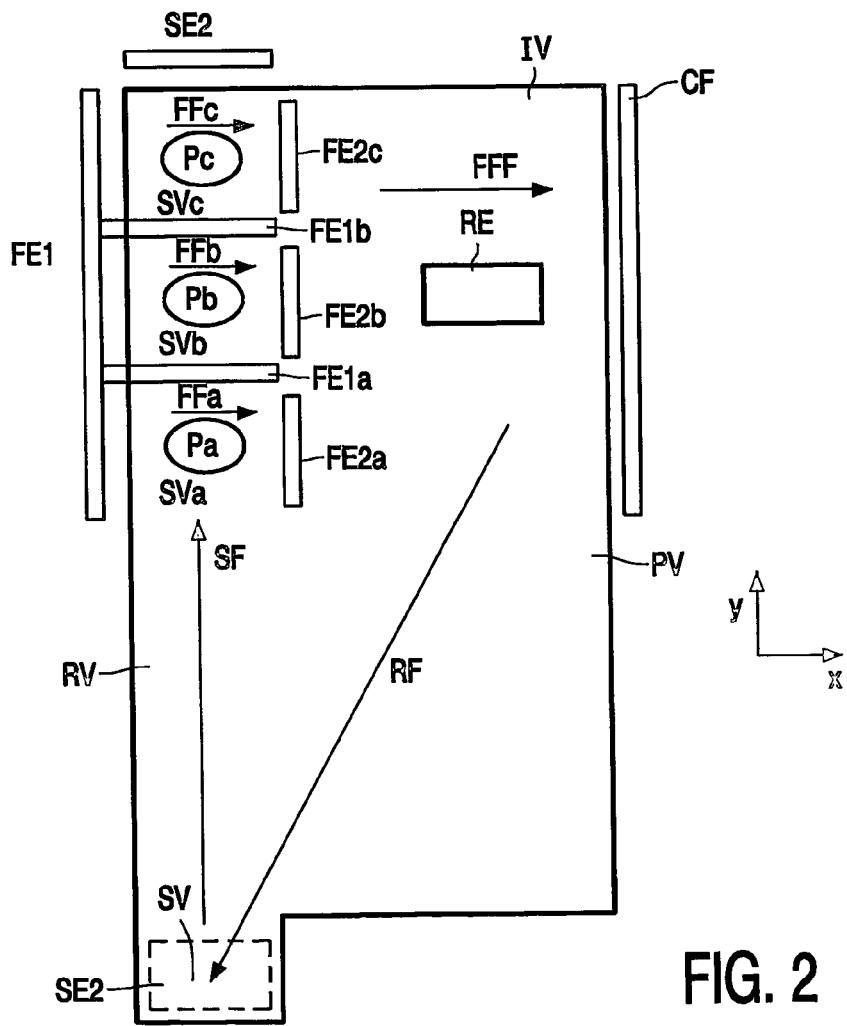
FIG. 2 shows a pixel with a single reservoir volume and a further fill electrode in accordance with another embodiment of the invention.

During the select phase, the particles Pa, Pb, Pc are separated within the reservoir volume RV using an attractive voltage pulse between the select electrodes SE1 and SE2 to attract the particles Pa, Pb, Pc towards the select electrode SE2. The most mobile particles Pc move the farthest, the particles Pa with the lowest mobility move over the smallest distance, the particles Pb with an in-between mobility move over a distance in-between the other distances. Thus, after the voltage pulse has been present between the select electrodes SE1 and SE2 during a suitable duration, the particles Pa, Pb, Pc are separated: the particles Pa are substantially present in the sub-volume SVa, the particles Pb are substantially present in the sub-volume SVb, and the particles Pc are substantially present in the sub-volume SVc, as is shown in FIG. 2. The sub-volumes SVa, SVb, SVc are schematically indicated by ellipsoids.

During the fill phase, all particles Pa, Pb, Pc are moved simultaneously from the sub-volumes SVa, SVb, SVc of the reservoir volume RV to the image volume IV using an attractive voltage pulse between the fill electrodes FE1 and FE2. As soon as sufficient particles Pa, Pb, Pc have entered the pixel volume PV, the attractive voltage pulse is removed from the fill electrodes FE1 and FE2.

As the particles Pa, Pb, Pc are moved simultaneously from the reservoir volume RV to the image volume IV, the refresh time of the pixel can be kept quite short. Once the particles Pa, Pb, Pc are within the image volume IV, they will be held there by a small repulsive voltage on the fill electrode FE2 until the next refresh period. During this image hold time, the particles Pa, Pb, Pc can mix by Brownian motion, or, when needed, (AC) electrical signals can be used to effectuate particle mixing inside the pixel 10.

FIG. 2 shows a pixel with a single reservoir volume and a further fill electrode in accordance with another embodiment of the invention. In the same manner as elucidated with respect to FIG. 1, the pixel 10 has a pixel volume PV which comprises a reservoir volume RV and an image volume IV. In the pixel 10, three differently colored particles Pa, Pb, Pc with different electrophoretic mobility are present. The visible color of the pixel is determined by the particles Pa, Pb, Pc which are present in the image volume IV. The select electrodes SE1 and SE2 are present at opposite sides of the reservoir volume RV.

The fill electrode FE2 now comprises three sub fill electrodes FE2a, FE2b, FE2c to generate a fill field which has three sub-fill fields FFa, FFb, FFc in the sub-volumes SVa, SVb, SVc, respectively. Thus now, three different (in strength and/or duration) fill electric fields FFa, FFb, FFc may be present, allowing to separately control the amount of particles Pa, Pb, Pc which will be moved into the image volume IV.

The fill electrode FE1 now comprises arms FE1a and FE1b which extend in the x-direction. These arms FE1a and FE1b shield the fill fields FFa, FFb, FFc occurring in adjacent ones of the sub-volumes SVa, SVb, SVc from each other. This reduces cross-talk effects in controlling the amount of particles Pa, Pb, Pc which have to leave the sub-volumes SVa, SVb, SVc. In a preferred embodiment, FE1a and FE1b are implemented as separate electrodes which may have individually definable voltages. This further increases the efficiency of selecting particles and filling the image volume.

A further fill electrode CF may be present to speed up the filling of the image volume IV by generating a further fill field FFF in the image volume IV to attract the particles Pa, Pb, Pc further into the image volume IV.

As soon as sufficient particles Pa, Pb, Pc have entered the image volume IV (i.e passed the smaller fill electrodes FE2a, FE2b, FE2c) excess particles Pa, Pb, Pc may be sent back using these smaller pixel electrodes FE2a, FE2b, FE2c.

The arrow RF indicates the electric field required to the move the particles Pa, Pb, Pc into the store volume SV during the reset phase of the pixel 10 when a high voltage is present on the select electrode SE1. The display may be constructed such that a high voltage can be supplied directly to the select electrode SE1 to speed up the reset phase. If the voltage has to be supplied to the select electrodes via TFT's, the voltage level will be limited.

It is also possible to add a reset electrode, for example in the image volume IV, to increase the field which directs the particles Pa, Pb, Pc back into the reservoir RE. Preferably this extra reset electrode is positioned in the center of the image volume IV. During the reset phase, first a voltage is supplied to the extra reset electrode to concentrate the particles Pa, Pb, Pc in the center of the pixel and than, a voltage is supplied to the select electrode SE1 to attract the particles Pa, Pb, Pc into the store volume SV. Alternatively, one of the existing electrodes, for example FE2a, may temporarily take the function of an additional reset electrode during the reset phase In the geometry of the reservoir volume RV shown in FIG. 1, the mobility of the slowest particle Pa is typically three times lower than that of the fastest particle Pc. In the geometry of the reservoir volume RV shown in FIG. 2, due to the long reservoir, the particles Pa, Pb, Pc can be separated even if the difference in the mobility is far smaller. For example, the mobility of the slowest particle Pa can be selected to be 75% of the mobility of the fastest particle Pc. Consequently, as the mobility of the slowest particle Pa is much higher than in the embodiment shown in FIG. 1, the time required to fill the image volume IV and the time to move the particles Pa, Pb, Pc back into the store volume SV decreases considerably.

Figure 3:
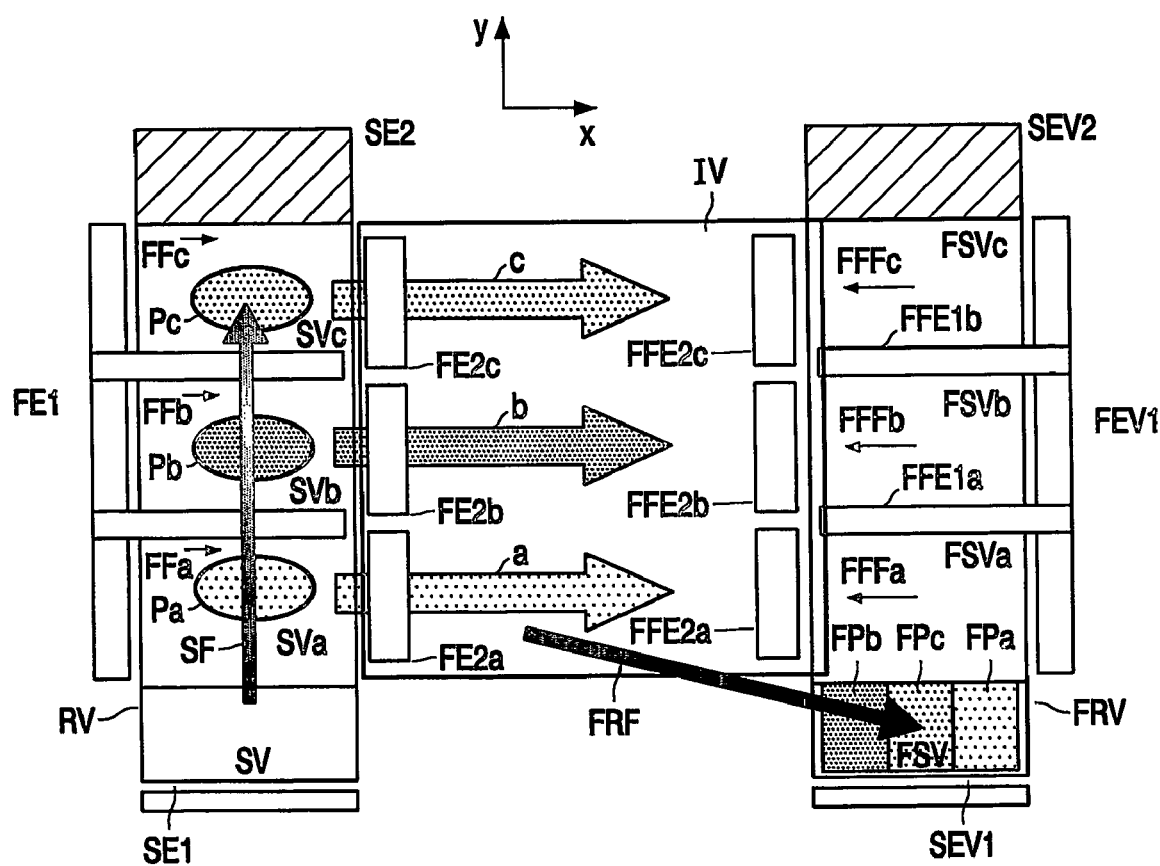
FIG. 3 shows a pixel with two reservoir volumes in accordance with an embodiment of the invention.

FIG. 3 shows a pixel with two reservoir volumes in accordance with an embodiment of the invention.

The pixel 10 shown in FIG. 3 is based or the pixel 10 shown in FIG. 2 wherein the further fill electrode CF is removed and a second reservoir FRV is added positioned opposite to the reservoir RV present in FIG. 2. The construction of the reservoir FRV is identical to the construction of the reservoir RV.

The reservoir FRV comprises: the select electrodes SEV1 and SEV2, three sub fill electrodes FFE2a, FFE2b, FFE2c to generate the sub-fill fields FFFa, FFFb, FFFc in the sub-volumes FSVa, FSVb, FSVc, respectively. Thus again, three different (in strength and/or duration) fill electric fields FFFa, FFFb, FFFc may be present, allowing to separately control the amount of particles Pa, Pb, Pc which will be moved from the reservoir volume FRV into the image volume IV. In this case, sub-fill electrodes FE2a, FE2b, FE2c can temporarily take the role of the further fill electrode CF to speed up the filling of the image volume IV by generating a further fill field FFF in the image volume IV to attract the particles further into the image volume IV.

The fill electrode FEV1 comprises arms FFE1b and FFE1a which extend in the x-direction. These arms FFE1a and FFE1b shield the fill fields FFFa, FFFb, FFFc occurring in adjacent ones of the sub-volumes FSVa, FSVb, FSVc from each other. This reduces cross-talk effects in controlling the amount of particles FPa, FPb, FPc which have to leave the sub-volumes FSVa, FSVb, FSVc.

In the reservoir volume FRV the particles FPa, FPb, FPc are attracted by the store field FRF into the store volume FSV.

The arrows indicated by a, b, c show the movement of the particles Pa, Pb, Pc, respectively, during the fill phase of the image volume IV from the reservoir RV.

The embodiments in accordance with the invention as shown in FIGS. 1 and 2 have the drawback that after removing the particles from the pixel volume PV during the reset phase, it is first necessary to select the particles Pa, Pb, Pc before the image volume IV can be filled. In a preferred embodiment as shown in FIG. 3, the image volume IV will be in contact with two reservoir volumes SV and FSV, whereby the particles FPa, FPb, FPc are reset into the store volume FSV of the reservoir volume FRV, and the particles Pa, Pb, Pc are selected in the other reservoir volume RV. In this manner, the separation of the particles Pa, Pb, Pc (the color selection) can be carried out prior to the start of the refresh period. It is then possible to move directly from the reset phase for the reservoir volume FRV to the fill phase from the reservoir RV, thereby further reducing the refresh time.

FIGS. 4 show pixels with a further fill electrode positioned in the image volume in accordance with an embodiment of the invention.

Figure 4A:
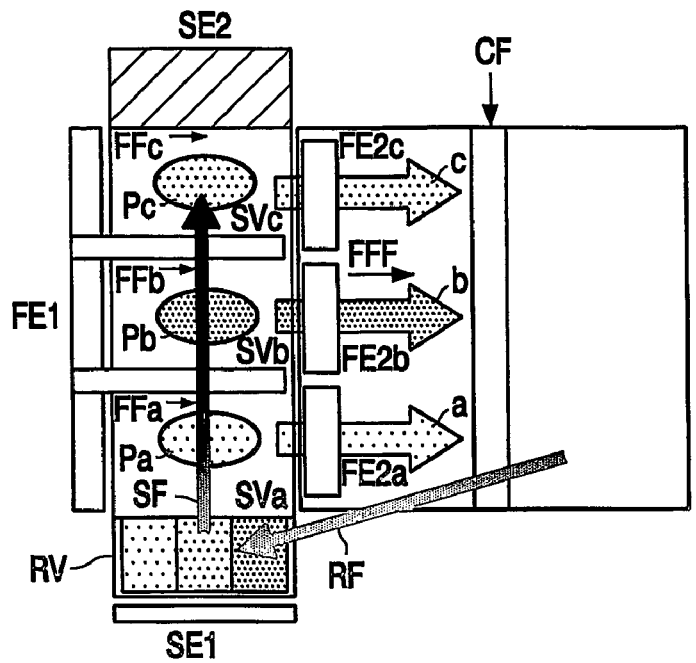
FIG. 4 show pixels with a further fill electrode positioned in the image volume in accordance with an embodiment of the invention.

FIG. 4A shows a pixel 10 with a single reservoir volume RV. The pixel 10 shown in FIG. 4A is based on the pixel 10 shown in FIG. 2, the only difference is that the position of the further fill electrode CF is changed in that it now is in the centre of the image volume IV such that the distance between the fill electrode CF and the particles Pa, Pb, Pc in the sub-volumes SVa, SVb, SVc substantially halves.

Figure 4B:
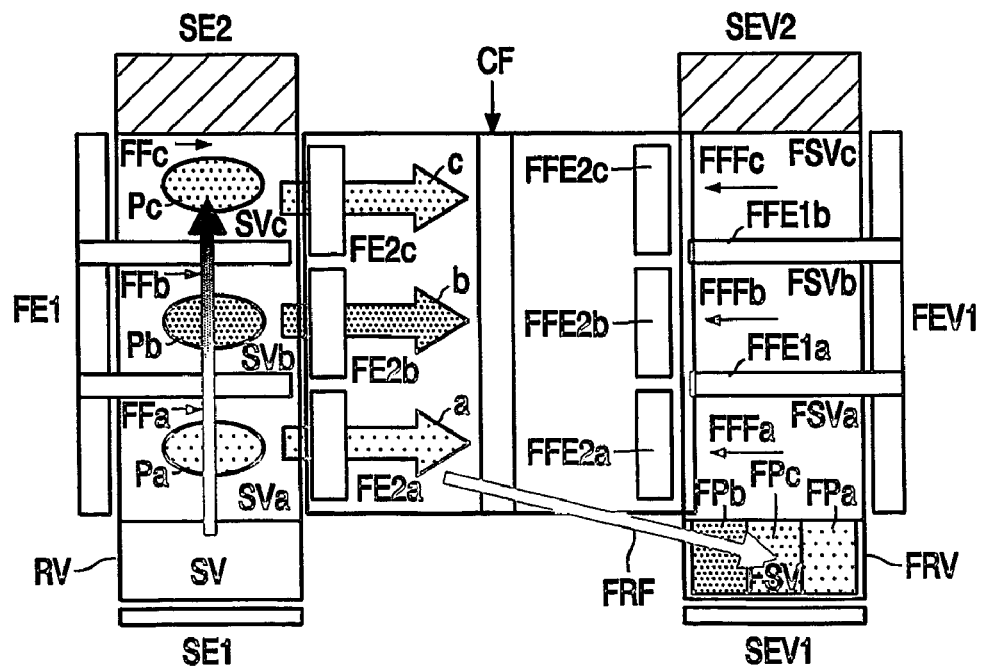

FIG. 4B shows a pixel 10 with two reservoir volumes RV and FRV. The pixel 10 shown in FIG. 4B is based on the pixel 10 shown in FIG. 3, the only difference is that a further fill electrode CF is added which is positioned in the centre of the image volume IV, such that the distance of the fill electrode CF is substantially equal to both the reservoir volumes RV and FRV.

In the embodiment in accordance with the invention as shown in FIG. 2, the further fill electrode CF used to fill the image volume IV is positioned at the opposite side of the image volume IV with respect to the reservoir volume RV. This results in a relatively low fill field FFF to move the particles Pa, Pb, Pc into the image volume IV, and hence slow filling of the image volume IV. The filling speed is increased by positioning the further filling electrode CF within the image volume IV, as is shown in FIG. 4A for a pixel 10 with a single reservoir volume RV, and in FIG. 4B for a pixel 10 with two reservoir volumes RV and FRV. With the further fill electrode CF positioned substantially in the centre of the image volume IV, the fill field FFF will be substantially two times higher, and filling will proceed in substantially half the time.

Positioning the further fill electrode CF even closer to the reservoir volume RV will further speed up the filling, but a practical requirement limiting the closeness is that sufficient space must be available to allow all particles Pa, Pb, Pc to move beyond the three fill electrodes FE2a, FE2b, FE2c (otherwise not all the particles Pa, Pb, Pc will be able to get into the image volume IV).

If the display is used in a transmissive mode, the further fill electrode CF is preferably constructed from a transparent conductor material, such as ITO.

FIGS. 5 show rectangular formed image volumes in accordance with an embodiment of the invention.

Figure 5A:
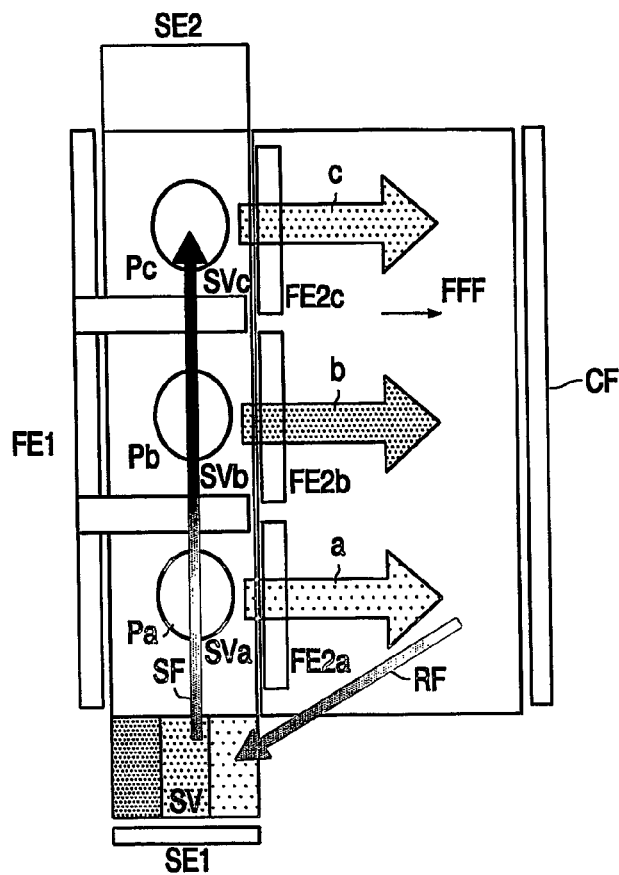
FIG. 5 show rectangular formed image volumes in accordance with an embodiment of the invention.

FIG. 5A shows a pixel 10 which only differs from the pixel 10 shown in FIG. 2 in that the image volume IV does not have square dimensions and the fill electrode CF is closer to the reservoir volume RV.

Figure 5B:
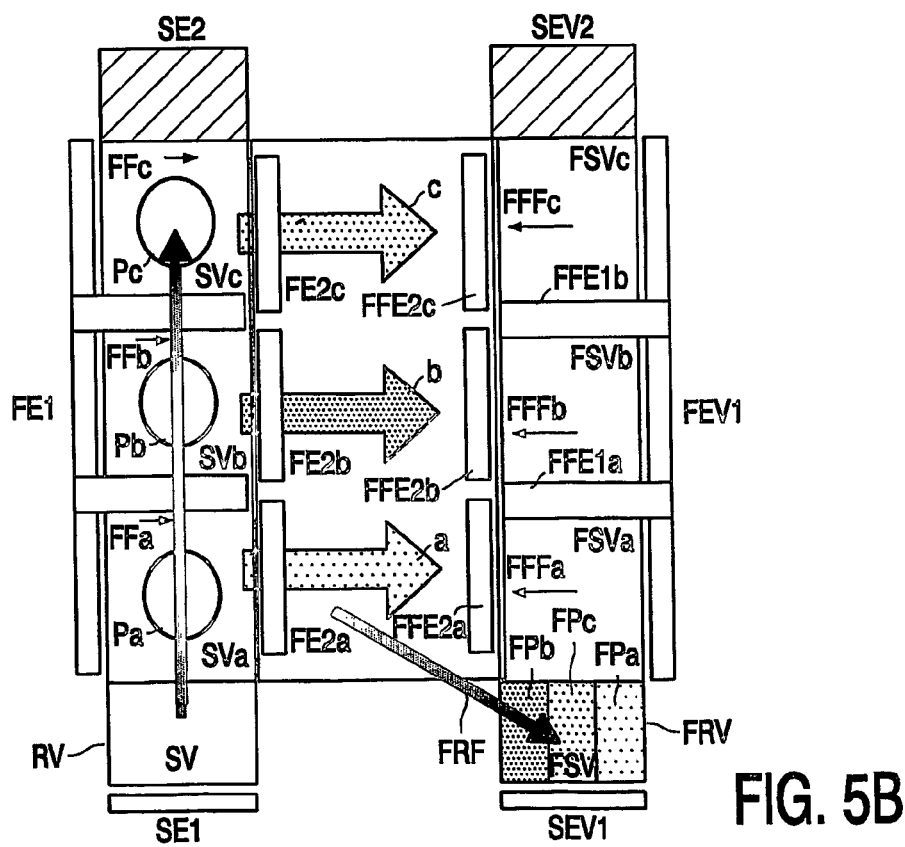

FIG. 5B shows a pixel 10 which only differs from the pixel 10 shown in FIG. 3 in that the image volume IV does not have square dimensions and the fill electrode CF is closer to both the reservoir volume RV and the reservoir volume FRV.

The embodiments in accordance with the invention as shown in FIGS. 1, 2 and 3 are concerned with pixels 10 with a predominantly square layout. Whilst this is a logical layout for a display whereby each pixel 10 can take any color, there are several less obvious pixel shapes whereby the refresh time can be further reduced. In FIG. 5 the pixel has a rectangle form. Now, in FIG. 5A, the fill electrode CF is closer to the reservoir RV than in FIG. 2, the fill field FFF will be higher, and filling will proceed faster.

One weakness of this pixel layout is that for a pixel 10 of the same area, the reservoir RV will become longer (in the y-direction) and the separation of the particles Pa, Pb, Pc will take a longer time. In the preferred embodiment as shown in FIG. 5B, whereby multiple reservoir volumes RV and FRV are used, the filling time is no longer an issue and this pixel 10 will thus be extra fast.

FIGS. 6 show pixels wherein the further fill electrode has a varying distance with respect to the sub-volumes in accordance with an embodiment of the invention.

Figure 6A:
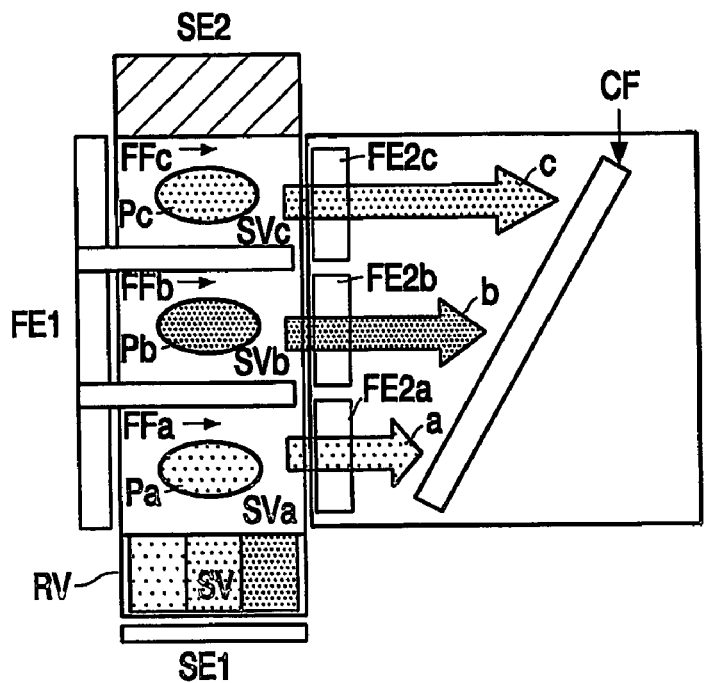
FIG. 6 show pixels wherein the further fill electrode has a varying distance with respect to the sub-volumes in accordance with an embodiment of the invention.

FIG. 6A shows a pixel 10 which only differs from the pixel 10 shown in FIG. 4A in that the fill electrode CF is positioned slanted with respect to the reservoir RV such that the distance to the particles Pa in the sub-volume SVa is shorter than the distance to the particles Pc in the sub-volume SVc. The dimensions of the image volume IV are the same.

Figure 6B:
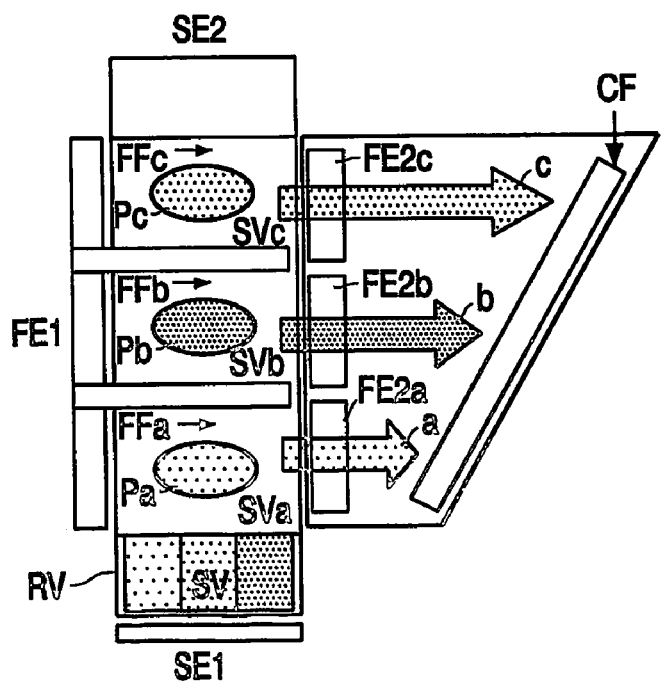

FIG. 6B shows a pixel 10 as shown in FIG. 6A in which the image volume IV is changed in that the fill electrode CF forms, or is adjacent to, a border of the image volume IV.

Figure 6C:
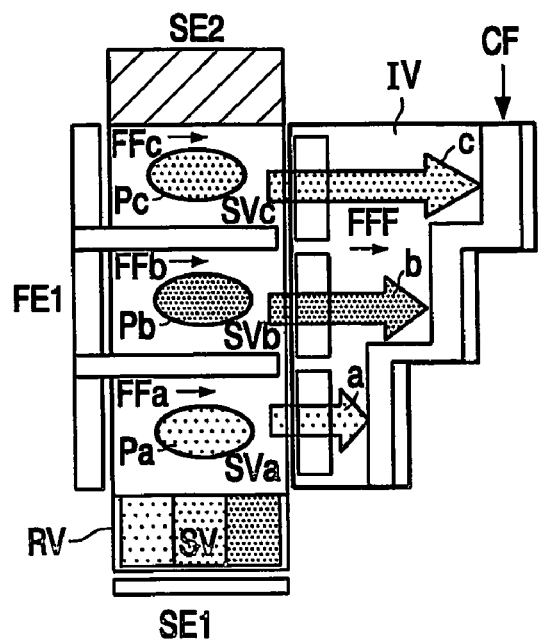

FIG. 6C shows a pixel 10 as shown in FIG. 6B in which the fill electrode CF is staircase shaped instead of slanted again such that the distance of the staircase associated with the sub-volume SVa is shorter than the distance of the staircase associated with the sub-volume SVc.

Figure 6D:
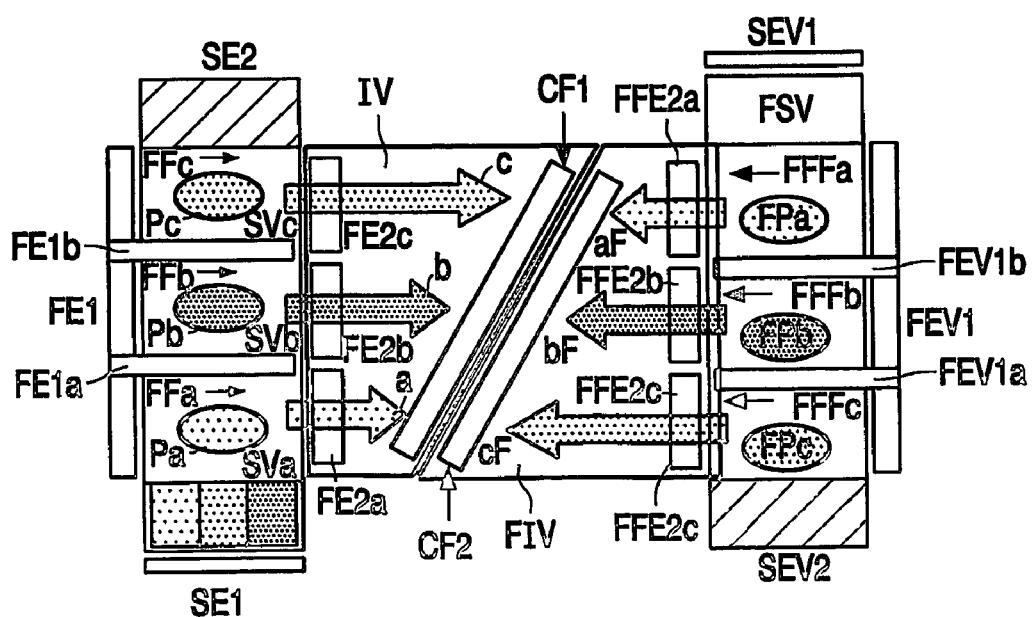

FIG. 6D shows two pixels 10 as shown in FIG. 6B which are position such that the two image volumes IV and FIV although separated, together cover substantially the same volume as the square pixel volume IV of the pixel 10 shown in FIG. 1.

If rectangular pixels 10 are used, the refresh speed is limited by the filling of the slowest particle Pa. In the embodiments in accordance with the invention which are shown in FIGS. 6, several layouts are shown wherein the fill electrode CF is structured relative to the reservoir volume RV of the pixel 10 in such a manner that the slowest moving particles Pa are subjected to the highest electric fill fields FFa By using this approach, the filling time can be further reduced, and image refresh speeds improved. In several cases, this approach results in a pixel layout which is no longer rectangular (i.e. with sloping, or stepped edges). Here, it may be necessary to pack pixels in alternating inverted layouts to maximize the aperture of the pixels.

Figure 7:
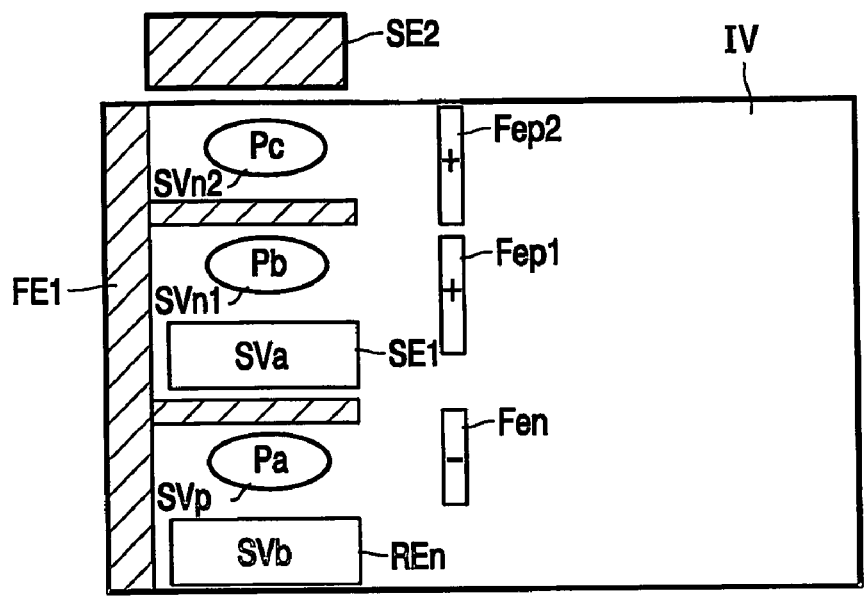
FIG. 7 shows a pixel with two negative particles and one positive charged particle.

FIG. 7 shows a pixel with two negative charged particles Pb, Pc and one positive charged particle Pa. In the embodiments in accordance with the invention described with respect to FIGS. 1 to 6, all the particles Pa, Pb, Pc have the same charge.

In the embodiment in accordance with the invention shown in FIG. 7, only the two negatively charged particles Pb, Pc need to be separated. This can be achieved with a smaller difference between the mobility of the negatively charged particles Pb, Pc. For example, the slowest particles Pb are only two instead of three times slower than the fastest particles Pc. Consequently, the pixel operating speed increases by a factor 3/2. Due to the different polarity of the charge of the particles the select electrode SE1 together with the select electrode SE2 generate the electric field for separating the particles Pb and Pc only. The store volume SVa of the particles Pb and Pc is the volume below or above the select electrode SE1.

The filling of the image volume IV now requires two positive fill electrodes Fep1 and Fep2, cooperating with the particles Pb, Pc in the sub-volumes SVn1 and SVn2, respectively, and one negative fill electrode Fen cooperating with the sub-volume SVp. Again, once the particles Pa, Pb, Pc are in the image volume IV, a uniform distribution will be facilitated by Brownian motion and/or additional AC signals to assist the particle Pa, Pb, Pc mixing.

During the reset period, the negative particles Pb and Pc are moved into the store volume SVa by a positive voltage on the select electrode SE1. The positive particles Pa are moved into the store volume SVb by a negative voltage on the reset electrode REn.

Both the fill phase as the reset phase will become shorter as the slowest particle Pb is less slow than in earlier embodiments. Preferably the mobility of the positively charged particles Pa is selected to be equal or higher as the mobility of the slowest one of the negatively charged particles Pb, Pc.

Figure 8:
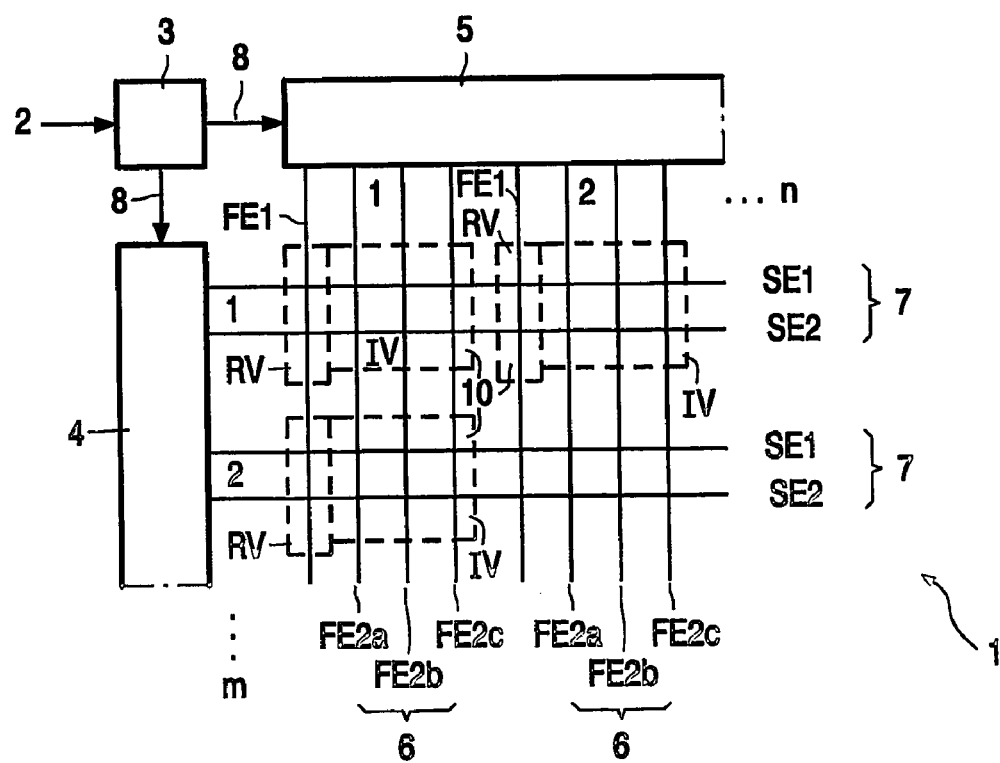
FIG. 8 shows a block diagram of a display apparatus with an electrophoretic matrix display in accordance with an embodiment of the invention.

FIG. 8 shows a block diagram of a display apparatus with an electrophoretic matrix display of an embodiment in accordance with the invention. The display 1 comprises a matrix of pixels 10 at intersections of crossings row or selection electrodes 7 and column or data electrodes 6. Two select electrodes SE1, SE2 and four data electrodes FE1, FE2a, FE2b, FE2c correspond to one pixel 10. The select electrodes SE1 may be interconnected. The data electrodes FE1 may also be interconnected.

The rows 1 to m of the pixels 10 are consecutively selected by means of a row driver 4, while the groups of column electrodes 1 to n are provided with data via a data register 5. Each pixel 10 comprises a reservoir volume RV and an image volume IV.

In the prior art, a full color pixel comprises three adjacent sub-pixels or cells usually one red cell, one blue cell and one green cell. In contrast, in the display in accordance with an embodiment of the invention, a full color pixel 10 comprises only a single image volume IV. Consequently, for a same resolution, the pixels 10 in accordance with the invention can be larger than the pixels of the prior art, or at comparable pixel dimensions a higher resolution is possible. In addition the colors of the display are brighter.

The incoming data 2 are first processed, if necessary, in a data processor 3. Mutual synchronization between the row driver 4 and the data register 5 takes place via drive lines 8.

Drive signals from the row driver 4 are supplied to the select electrodes SE1 and SE2 to separate the particles Pa, Pb, Pc in the sub-volumes SVa, SVb, SVc during the select period, and to move the particles Pa, Pb, Pc back into the store volume SV during the reset phase.

Drive signals from the data driver 5 are supplied to the fill electrodes FE1, FE2a, FE2b, FE2c to move the separated particles Pa, Pb, Pc from the reservoir volume RV into the image volume IV. The voltage on the extra fill electrode CF, when present, may also be supplied by the data driver 5.

Such driving may be suitable for small matrix or segmented displays. More generally however, the display will be driven by an active matrix, comprising thin film transistors (TFTs), diodes or other active elements. In the case of a TFT active matrix, each pixel will further comprise a multiplicity of addressing (or selection) TFTs. A line of pixels is selected by applying a pulsed voltage to the addressing TFTs, whereby these become conductive and connect the electrodes in the pixel to data signals being generated by the data driver 5. It is also possible that some electrodes are common to a multiplicity of pixels.

It should be noted that the above-mentioned embodiments illustrate rather than limit the invention, and that those skilled in the art will be able to design many alternative embodiments without departing from the scope of the appended claims.

For example, it is not essential to the invention that the x-direction and the y-direction are perpendicular, what counts is that the select field SF separates the particles Pa, Pb, Pc, in sub-volumes SVa, SVb, SVc and the fill field FF moves the separated particles Pa, Pb, Pc into the image volume IV.

The invention is also useful for displays in which two or more than three different particles types are present.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An electrophoretic display with a pixel comprising:
   a reservoir volume and an image volume,
   particles having different colors and different electrophoretic mobilities, wherein the particles determine a visible color of the pixel when present in the image volume, and wherein the particles do not contribute to the visible color of the pixel when present in the reservoir volume,
   select electrodes for generating in the reservoir volume a select electric field for separating the particles in different sub-volumes in the reservoir volume, and
   at least one fill electrode for generating a fill electric field (FF) to move the particles from the sub-volumes into the image volume, wherein an outer perimeter of the pixel is non-uniform.

2. The electrophoretic display as claimed in claim 1, wherein the at least one fill electrode is positioned to obtain the fill electric field directed for simultaneously moving the particles from the sub-volumes into the image volume.

3. The electrophoretic display as claimed in claim 1, wherein the fill electrodes comprise sub fill electrodes associated with the different sub-volumes for generating the fill electric field to comprise sub fill electric fields in the different sub-volumes.

4. The electrophoretic display as claimed in claim 3, wherein the select electric field extends in a first direction and the sub fill electric fields in a second direction different from the first direction.

5. The electrophoretic display as claimed in claim 4, wherein the reservoir volume comprises shielding electrodes for substantially shielding in the first direction the sub fill electric fields of the different sub-volumes from each other.

6. The electrophoretic display as claimed in claim 4, wherein the pixel comprises a further fill electrode arranged in the image volume in the second direction further away from the reservoir volume than the sub fill electrodes for attracting the particles leaving the sub-volumes further into the image volume.

7. The electrophoretic display as claimed in claim 6, wherein the further fill electrode is positioned in the second direction at a border of the image volume at a maximal distance from the reservoir volume.

8. An electrophoretic display comprising a pixel comprising,
   a reservoir volume and an image volume,
   particles having different colors and different electrophoretic mobilities, wherein the particles determine a visible color of the pixel when present in the image volume, and wherein the particles do not contribute to the visible color of the pixel when present in the reservoir volume,
   select electrodes for generating in the reservoir volume a select electric field for separating the particles in different sub-volumes in the reservoir volume, and
   at least one fill electrode for generating a fill electric field to move the particles from the sub-volumes into the image volume,
   wherein the fill electrodes comprise sub fill electrodes associated with the different sub-volumes for generating the fill electric field to comprise sub fill electric fields in the different sub-volumes,
   wherein the select electric field extends in a first direction and the sub fill electric fields in a second direction different from the first direction,
   wherein the pixel comprises a further fill electrode, and
   wherein the further fill electrode is positioned in the second direction within the image volume but at less than the maximal distance from the reservoir volume.

9. The electrophoretic display as claimed in claim 6, wherein the further fill electrode is positioned with respect to the sub-volumes to obtain a till electric field which is higher for the particles having a slower electrophoretic mobility than for the particles having a higher electrophoretic mobility.

10. The electrophoretic display as claimed in claim 1, further comprising:
    a further reservoir volume,
    further select electrodes for generating in the further reservoir volume a further select electric field for separating the particles in further different sub-volumes in the further reservoir volume, and
    further fill electrodes for generating a further fill electric field to simultaneously or time sequentially move the different types of particles from the further sub-volumes into the image volume.

11. The electrophoretic display as claimed in claim 10, wherein the electrophoretic display comprises a controller for controlling the select electrodes, the at least one fill electrode, the further select electrodes, and the further fill electrodes to obtain a separation of the particles in the reservoir volume simultaneously to filling or resetting particles to or from the further reservoir volume, or the other way around.

12. The electrophoretic display as claimed in claim 1, wherein the image volume is box shaped, the select electrodes being arranged for generating the select electric field in a first direction substantially parallel with a border plane of the image volume, and the fill electrodes being arranged for generating the fill electric field in a second direction substantially perpendicular to the first direction.

13. The electrophoretic display as claimed in claim 1, further comprising reset means for removing the particles from the image volume to store the particles in a store volume in the reservoir volume.

14. The electrophoretic display as claimed in claim 13, wherein the reset means comprise one of the select electrodes for attracting the particles in the image volume towards the store volume adjacent to the one of the select electrodes.

15. The electrophoretic display as claimed in claim 1, wherein the mobility of the particles has a predetermined ratio, and wherein a movement path of the particles in the reservoir volume has a length to enable the particles to be separated in the sub-volumes which are substantially non-overlapping.

16. The electrophoretic display as claimed in claim 15, wherein the particles comprise a first, second and third type of particles all being charged in the same polarity, and having different mobilities.

17. The electrophoretic display as claimed in claim 15, wherein the particles comprise a first and a second type of particles both being charged in the same polarity and having different mobilities and a third type of particles being charged oppositely.

18. The electrophoretic display as claimed in claim 1, wherein the pixel comprises a reset electrode to attract the particles during a reset phase wherein the particles have to be moved into a store volume in the reservoir volume.

19. The electrophoretic display as claimed in claim 18, wherein the reset electrode is associated with the center of the image volume, and wherein the electrophoretic display further comprises a processor for successively supplying a voltage to the reset electrode to attract the particles towards the center of the image volume and a voltage to one of the select electrodes being associated with the store volume to attract the particles to move into the store volume.

20. A method of driving an electrophoretic display with a pixel, the electrophoretic display comprising:

a reservoir volume and an image volume, particles having different colors and different electrophoretic mobilities, wherein the particles determine a visible color of the pixel when present in the image volume, and wherein the particles do not contribute to the visible color of the pixel when present in the reservoir volume, the method comprising:

generating in the reservoir volume a select electric field for separating the particles in different sub-volumes in the reservoir volume, and generating a fill electric field to move the particles from the sub-volumes into the image volume, wherein an outer perimeter of the pixel is non-uniform.

21. A display apparatus comprising an electrophoretic display as claimed in claim 1, wherein a portion of the perimeter bulges outward.

* * * * *